Jan. 12, 1965 E. R. SARRATT 3,165,706

FREQUENCY GENERATING SYSTEM

Filed Aug. 9, 1961 4 Sheets-Sheet 1

INVENTOR.
EVERETT R. SARRATT
BY Robert C. Smith
ATTORNEY

Jan. 12, 1965 E. R. SARRATT 3,165,706

FREQUENCY GENERATING SYSTEM

Filed Aug. 9, 1961 4 Sheets-Sheet 2

INVENTOR.
EVERETT R. SARRATT
BY Robert C. Smith
ATTORNEY

Jan. 12, 1965 E. R. SARRATT 3,165,706

FREQUENCY GENERATING SYSTEM

Filed Aug. 9, 1961 4 Sheets-Sheet 3

INVENTOR.
EVERETT R. SARRATT
BY
Robert C. Smith
ATTORNEY

Jan. 12, 1965 E. R. SARRATT 3,165,706

FREQUENCY GENERATING SYSTEM

Filed Aug. 9, 1961 4 Sheets-Sheet 4

INVENTOR.
EVERETT R. SARRATT
BY Robert C. Smith
ATTORNEY

United States Patent Office 3,165,706
Patented Jan. 12, 1965

3,165,706
FREQUENCY GENERATING SYSTEM
Everett R. Sarratt, Baltimore, Md., assignor to The Bendix Corporation, Towson, Md., a corporation of Delaware
Filed Aug. 9, 1961, Ser. No. 130,331
3 Claims. (Cl. 331—18)

This invention relates to means for generating voltages of a desired frequency and more particularly to a means capable of providing output voltages which may vary over a wide range of frequencies, each of said frequencies having the intrinsic stability of that obtained from a single frequency master control oscillator.

Much of the radio and communications equipment presently in use contains means permitting transmission and receiving of signals of many different frequencies and, because of the high standards of frequency stability normally required, such equipment is greatly complicated and substantially increased in size and weight in order to meet these requirements. The usual methods of providing the number of frequencies required involve the use of a number of heterodyne converter stages which introduce problems of spurious signals and power dissipation, thus calling for extra frequency conversion stages and filtering networks. In other applications, large numbers of crystals are used to vary the frequency output of a controlled oscillator.

To overcome the above described disadvantages, I have devised a system of frequency generation and control using direct digital techniques. This system offers substantial advantages over the prior art schemes in performance, capability, in size and weight and in power dissipation. It also permits reduction of spurious frequencies to a bare minimum since heterodyne action is not required to arrive at the final signal frequency. It is therefore of an object of the present invention to provide a frequency generating system which reaches high standards of performance in precisely generating a large number of different frequencies and yet is substantially reduced in size and weight as compared with equipment presently available which attempts to perform the same functions.

It is another object of the present invention to provide a frequency generating system which accomplishes the above object without the use of means introducing substantial amounts of spurious signal component.

It is another object of the present invention to provide a frequency generating system which accomplishes the above objects and which involves less power consumption and power dissipation than devices presently available for performing the same or similar functions.

It is a further object of the present invention to provide a frequency generating system which accomplishes the first object stated above without use of large numbers of piezo-electric crystals or similar devices.

Other objects and advantages will become apparent from the following specification taken in connection with the accompanying drawings in which.

Description of the operating principles of my frequency generating system is presented in two stages. The first stage describes the operation of the fundamental digital control oscillator shown in FIGURE 1 and the second stage describes the system including means for greatly expanding the range of frequencies available over that supplied from the basic digital control oscillator.

Figure 1:
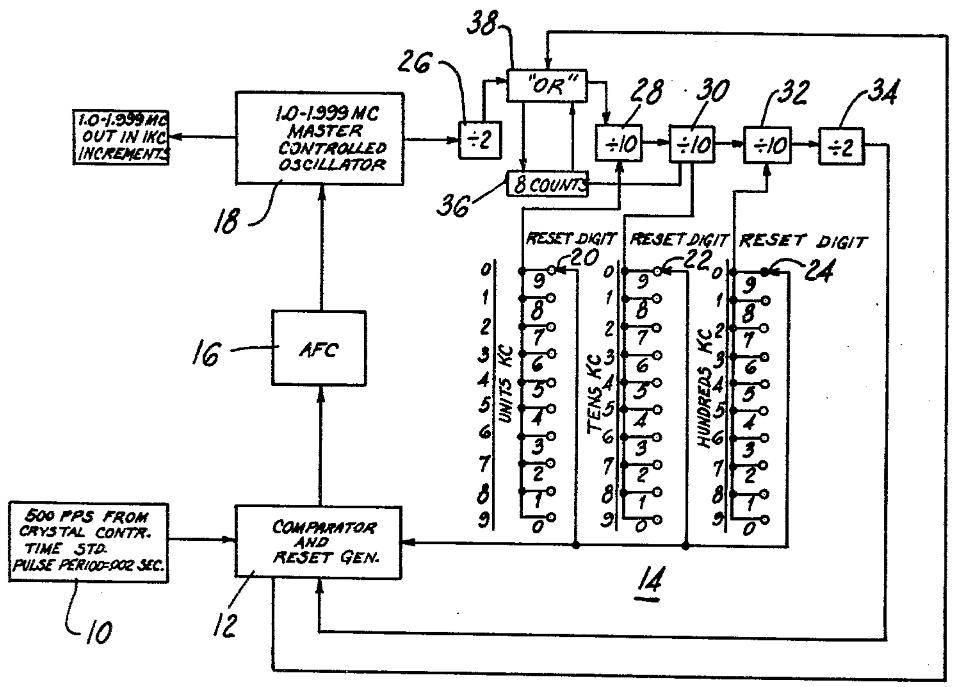
FIGURE 1 is a block diagram showing my basic digital control oscillator capable of operating over a desired frequency range.

The system shown in FIGURE 1 is capable of supplying output frequencies varying in 1 kc. intervals over a range from 1.0 mc. to 1.999 mc. Other ranges and intervals could as well be selected should they suit a given application. A crystal controlled time standard oscillator 10 produces a regular, rigidly-controlled output of 500 pulses per second which is fed to a comparator and reset generator circuit 12, the details of which are described below in connection with FIGURE 2. For the moment let it be understood that comparator circuit 12 receives pulse inputs from the time standard oscillator 10, and the decade counter frequency divider chain, shown generally at numeral 14, and compares these inputs, emitting an output voltage pulse varying in polarity and magnitude (pulse width) depending upon the direction and magnitude of error, if any, between the signal emitted from the frequency divider chain 14 and that from the time standard oscillator 10. This output voltage is then fed to an automatic frequency control circuit 16 which responds to the polarity and magnitude of the output signal from comparator 12 in such manner as to cause a correction in the output of a master controlled oscillator 18 which is capable of producing voltages of frequencies varying from 1.0 mc. to 1.999 mc. The output from the master controlled oscillator 18, in addition to being supplied to an external utilization circuit, is also supplied to the frequency divider chain 14.

The frequency divider chain 14 may be set by a plurality of digital frequency selector switches 20, 22 and 24 to divide the pulses from oscillator 18 by factors of from 2000 to 3998 in steps of two. A first division by two is afforded by a unit 26 which may be a binary counter unit consisting of a standard flip-flop circuit and successive divisions by units of from one to ten is afforded by each of the series of three decade counters 28, 30 and 32 which collectively provide means for dividing by any selected number between 1 and 1000. An additional division by two is afforded by a unit 34 which may be identical to unit 26. Unit 34 acts to force the decade counters through two successive cycles, the first of which counts pulses from the divider 26 in accordance with the particular setting on switches 20, 22 and 24 and the second which always counts the entire 1000 counts of the decades. The reset pulse from the comparator 12 only affects the first countdown cycle of the decade counters. This reset pulse also effectively advances the units switch by one unit. This may actually be done by a number of means depending on the specific decade counters used. Where the decade counters 28, 30 and 32 are beam switching tubes such as the type BX 1000 Beam–X tube manufactured by the Burroughs Corporation, there is a comparatively significant reset time required which in the present application amounts to a maximum of eight counts of the oscillator 18. It thus becomes necessary to provide an eight count storage device 36 which may consist of a series of binary counters similar to unit 26. When the reset pulse is supplied from the comparator circuit it operates an "or" circuit 38 which switches the oscillator pulses to the storage device 36. This device then counts eight pulses at which time it supplies an output signal back to the "or" circuit 38. This puts the "or" circuit in a position to be enabled such that the ninth pulse from the oscillator does enable the "or" circuit and the tenth pulse is supplied to the decade counter. At the same time the storage device 36 responds to the eighth pulse it also supplies a pulse to the tens counter 30 to advance it one step. The effect of the foregoing is to advance the decade counter by one unit in order to account for the ten pulses missed during reset. The decade counter will therefore count any number from 2000 to 3998 cycles of the oscillator before emitting an output pulse to the comparator to be compared with the pulse from the time standard oscillator 10.

Figure 2:
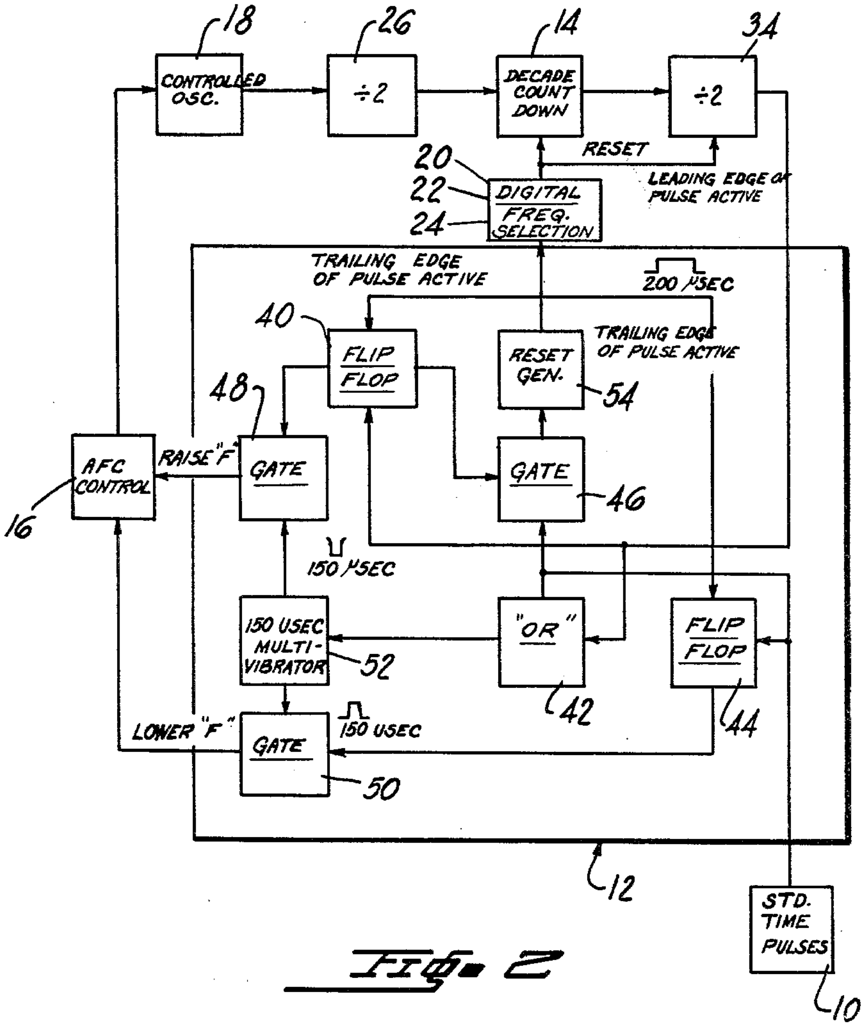
FIGURE 2 is a block diagram showing the details of the comparator used in the FIGURE 1 device.

In FIGURE 2 the detailed organization of the comparator and reset generator 12 is shown in block diagram in association with some of the structure of FIGURE 1. The signal from the binary unit 34 is supplied to a flip-flop circuit 40 and to an "or" circuit 42. The output from the time standard oscillator 10 is connected to a flip-flop 44, a gate circuit 46 and the "or" circuit 42. Flip-flop circuit 40, upon receiving a pulse from unit 34 acts to enable gate 46 and to disable a gate 48. When flip-flop circuit 44 receives a pulse from the time standard oscillator 10, it disables a gate circuit 50. When the frequency output of the decade counter 14 and the binary unit 34 is higher than that from the time standard oscillator 10, the pulse from unit 34 leads the time standard pulse and is supplied to flip-flop circuit 40, which acts to disable gate 48 and enable gate 46, as described. This pulse is also fed to the "or" circuit 42 which supplies a pulse to a multivibrator 52 which, when so energized, produces a 150 microsecond pulse. This pulse is supplied to both of gates 48 and 50 but gate 48, being disabled, is not responsive to the input, but gate 50, which operates like a normally closed switch, passes this pulse to the automatic frequency control 16. The control 16 may use any of several well-known techniques for altering the resonant frequency of the controlled oscillator 18. One acceptable method is by using a voltage averaging means such as a rectifying and filtering circuit and applying its output to bias a voltage variable semiconductor capacitor in the oscillator circuit. Another means might be to apply this average voltage to a circuit including a series of taps on an inductor in oscillator 18 together with means, for effecting a trim on the selected inductance by the use of such a voltage variable semiconductor capacitor. As succeeding pulse from oscillator 10 disables gate 50, thus disconnecting the multivibrator 52 from the automatic frequency control 16 and limiting the effective pulse width and, hence, the average voltage of the frequency correction signal. These correction pulses are a maximum of 150 microseconds wide for large differences in the master oscillator and time standard repetition rates, and diminish to a fractional part of a microsecond as the two sets of pulses approach time coincidence. With gate 46 enabled, as described, the pulse from the oscillator 10 will pass through this gate to the reset generator 54, where it may be amplified and shaped as desired to function as a reset pulse for the particular decade counting devices used. This reset pulse is significantly longer than the pulse from multivibrator 52 so that the comparator will always be able to complete its correction cycle. In the present instance a 200 microsecond multivibrator has been incorporated into reset generator 54 and only the trailing edge of this pulse produces a signal of the proper polarity to reset flip-flop circuits 40 and 44. This reset pulse also acts to operate the "or" circuit 38, as described above (FIG. 1). It will thus be observed that each comparison period involving the two trains of pulses is started with the two pulses in near time coincidence by having the pulses from the time standard trigger the reset generator 54.

When the frequency output of the decade counter 14 and unit 34 is lower than that from the time standard oscillator 10, the first pulse received by the comparator circuit is from oscillator 10. This pulse then operates flip-flop circuit 44, which, in turn, disables gate 50; and is fed to gate 46 and the "or" circuit 42. Gate 46 is normally disabled, so the pulse is blocked at this point, but is supplied through the "or" circuit 42 to the 150 microsecond multivibrator 52. With the gate 50 disabled and the gate 48 enabled, the pulse from multivibrator 52 is supplied through gate 48 to the automatic frequency control circuit 16 in the opposite polarity from the pulses emitted from gate 50. The succeeding pulse from the decade counter and unit 34 then operates flip-flop 40 which disables gate 48 and terminates the correction pulse. The width of the pulse supplied to circuit 16 is variable with the amount of phase discrepancy between the time standard pulses and those from unit 34 as described, and the correcting voltage produced in circuit 16 varies in magnitude with this pulse width and in polarity with direction of frequency from the time standard. A succeeding pulse from the time standard oscillator 10 then finds gate 46 open and this pulse is supplied to the reset generator 54 to reset the counter for a new cycle.

Figure 3:
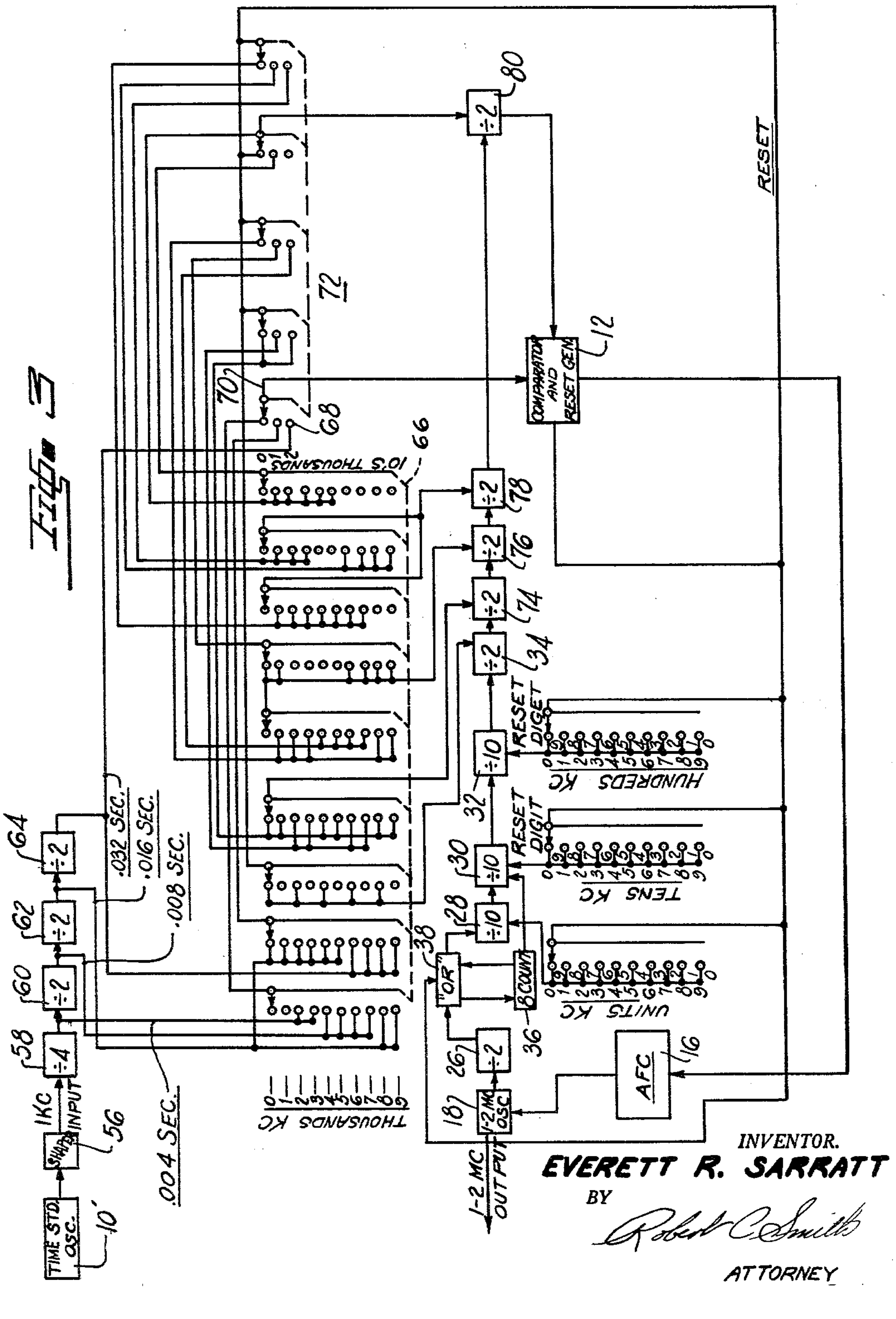
FIGURE 3 is a block diagram showing the arrangement for greatly extending the range of my frequency synthesizer.

The digital coverage of the basic 1.0 to 1.999 mc. oscillator may be considerably extended by the use of the additional means shown in FIG. 3. This is done by multiplying the basic frequency after dividing the basic coverage into bands as required to maintain the frequency increment at the same value as in the basic system described above—in this case, one kilocycle. To accomplish this, the division factor is altered along with the time standard pulse period. FIGURE 3 is a block diagram showing the major component units of the basic master oscillator which, when combined with the companion multiplier and the time standard units serve as the 2.5 to 29.999 megacycle frequency synthesizer. The basic master oscillator control scheme has been described in the previous section and similar numerals will be affixed to the corresponding components in FIGURE 3. In this application the time standard oscillator 10′ produces a pulse output having a 1 kc. output frequency which is supplied to a wave shaping circuit 56 and thence to a frequency dividing circuit 58 which may consist of a pair of flip-flop circuit and divides by four thereby producing an output at 250 cycles (pulse period of .004 sec.). This signal is successively fed to frequency dividing circuits 60, 62 and 64, each of which effectively divides its input frequency by two such that the output pulse period of divider 60 is .008 sec.; that of divider 62 is .016 sec. and that of divider 64 is .032 sec. The outputs of these divider circuits are connected to the appropriate taps of a nine deck, ten position switch, shown generally at numeral 66, and the output of divider 64 is also connected to the third tap 68 of the first deck 70 of a five deck, three position switch shown generally at numeral 72. The output from switches 66 and 72 is a time standard oscillator frequency, divided by a desired factor appropriate to the frequency range selected on the switches 66 and 72, which is fed to the comparator and reset generator 12. This time standard frequency signal is compared as to phase relationship in the comparator 12 with the pulse output of the decade counter, as described above. Switches 66 and 72 also control the reset scheme for the frequency countdown range divider which includes the series of binary counters (flip-flops) 34, 74, 76, 78 and 80 which vary the number of complete cycles of the decade counter required to produce a pulse output to the comparator 12 which is compared with the time standard pulse from switch 72. As will be recognized by those skilled in the art, this series of five binary counter units can be pre-set by setting each individual flip-flop circuit to one or the other of its two stable states to provide a division by an integer from one to thirty-two. The number of oscillator pulses will be increased by 2000 and the number of pulses through the decade counter will be increased by an even thousand for every increment in the pre-set division of the series of binary counters.

In the full coverage synthesizer it was desired to cover the frequency range from 2.5 to 29.999 mc. Other ranges and increments could as well be chosen using the teachings of the present disclosure. For this particular range it is not necessary to use the .002 sec. time standard, so the time standard oscillator 10′ is shown as producing a 1 kc. output which, after being modified in the wave shaper circuit 56, is divided by four in the frequency dividing circuit 58. I thus use a .004 sec. time standard pulse for the lowest frequency ranges in the full coverage synthesizer. The lowest frequency range selected by switches 66 and 72 is that from 2.5 to 2.999 mc. As produced in the full coverage synthesizer, the .004 sec. time standard is selected and is divided into an output from the decade and the binary counters 34, 74, 76, 78 and 80 which are set to require between 4000 and 5998 cycles of the master oscillator 18 before a pulse is supplied to the comparator 12. Using the same relationship set forth above in the description of the basic unit:

$$\frac{4000 \text{ cycles}}{.004 \text{ sec.}}=1.0 \text{ mc./sec. and } \frac{5998 \text{ cycles}}{.004 \text{ sec.}}=1.4995 \text{ mc./sec.}$$

Of this range only the upper half is required so nothing is used below 5000 cycles which when divided by .004 sec. gives 1.25 mc./sec. When the frequencies in the range from 1.25 mc./sec. to 1.4995 mc./sec. are emitted from the master oscillator, they are then supplied to a frequency doubler circuit which multiplies the frequencies by two to produce frequencies in the desired range of 2.5 to 2.999 mc./sec. The doubler circuits will be discussed below. These obviously must be coordinated with the switches 66 and 72 to provide the correct number of frequency muliplications of the signal emitted from the basic master oscillator 18.

Consider now the next frequency range 3.0 to 3.999 mc./sec. The switches 66 and 72 are positioned to cause an effective division by four in the series of binary counters 34, 74, 76, 78 and 80. This results in the master oscillator 18 being required to emit 2000 more cycles than required for the frequency range discussed above before an input pulse is supplied to the comparator 12. This range of 6000 to 7998 cycles, when divided by the .004 sec. time standard gives 1.5 to 1.9995 mc./sec., which, when doubled once, produces the desired 3.0 to 3.999 mc./sec. The next range 4.0 to 4.999 mc./sec. requires that the switches 66 and 72 be positioned such that the counters produce an effective division by five, thus requiring the master oscillator 18 to produce 8000 to 9998 cycles before a pulse is supplied to the comparator 12. Division by the .004 sec. time standard pulse, however, results in values above the 2 mc. limit of the master oscillator 18, so it is necessary that the switches 66 and 72 now be positioned to connect the .008 time standard pulse to the comparator. The master oscillator frequency range selected is then 8000 cycles divided by the .008 sec. time standard which equals 1 mc./sec. to 9998 divided by .008 sec. which equals 1.24975 mc./sec. This master oscillator output frequency must be multiplied by four (through two frequency doubler circuits) to produce the desired 4.0 to 4.999 mc./sec. frequency range. The same general system is applicable to all of the ranges up to the range of 29.0 to 29.999 mc./sec. For example, in this last range the switches 66 and 72 are positioned to cause the binary counters 34, 74, 76, 78 and 80 to provide an effective division by 30 and the .032 time standard pulse is supplied to the comparator 12. The decades and binary counters send one pulse to the comparator for every 58,000 to 59,998 cycles of the master oscillator. These produce a master oscillator output range of $$\frac{58{,}000 \text{ cycles}}{.032 \text{ sec.}}=1.8125 \text{ mc./sec. to } \frac{59{,}998}{.032 \text{ sec.}}= 1.8749375 \text{ mc./sec.}$$

It will be observed that the band of output of the master oscillator is comparatively narrow in this range, but this band is still divisible by the decade counter into 1000 increments so that when the oscillator output is multiplied by sixteen (successively doubled four times) the one kilocycle frequency increments are still available over the 29.0 to 29.999 mc. range as well as the 1.0 to 1.999 mc. range.

Figure 4:
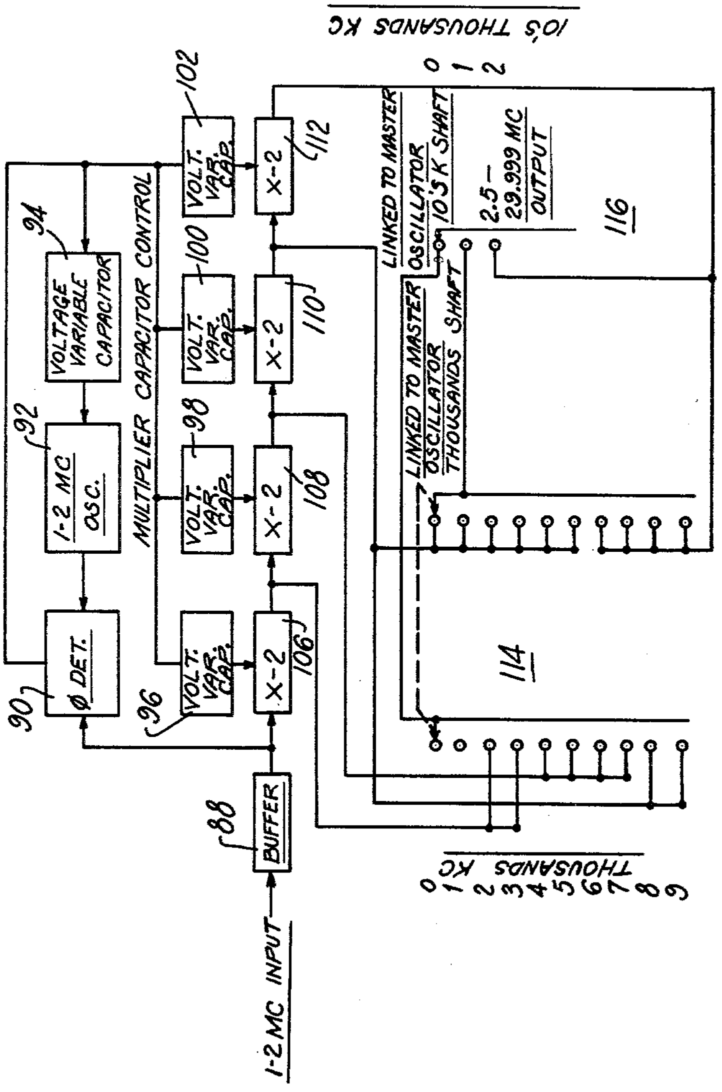
FIGURE 4 is a block diagram of the frequency multiplier system used with the system of FIGURE 3.

The output signal of the 1.0–2.0 mc. master controlled oscillator is multiplied to the final synthesizer output frequency by means of the arrangement shown in block diagram in FIGURE 4. The output signal from the master controlled oscillator 18 is supplied to a buffer 88 which serves as an isolating and amplifying means and the amplified signal is then connected to a phase detector circuit 90 which may be any of several circuits well known in the art. Comparator 12 is an example of a comparatively complicated phase detector. Also supplied to phase detector circuit 90 is a phase output signal from another 1.0–2.0 mc. oscillator 92. The detector circuit 90 compares the frequencies from circuits 88 and 92 and any phase error signal, after filtering, is supplied as a correction voltage to a voltage variable capacitor 94 which varies its effective capacitance in response to changes in its input voltage and thereby changes the resonant frequency of the controlled oscillator 92 such that its output will agree in frequency with that from buffer 88. Such capacitors may be similar to the type PC–117–47, 10.7–132 mmf. units manufactured by the Pacific Semiconductor Corporation.

The output signal from detector 90 is also supplied to a series of additional voltage variable capacitors 96, 98, 100 and 102 which control the output frequencies of a plurality of frequency doubler circuits 106, 108, 110 and 112. These frequency doubler circuits are connected to a multiposition switch shown generally at 114 which may be mounted on a common shaft with switch 66 and to a three position switch 116 which may be mounted on the same shaft with switch 72.

It will be remembered that the output of buffer 88 covers the range from 1.0–2.0 mc. This range requires that the frequency doubler circuits be tuned for the various frequencies in this range. A typical frequency doubler circuit may consist of an oscillator circuit including a vacuum tube in which the fundamental frequency is connected to the input between the grid and cathode and the anode circuit includes a resonant circuit tuned to the second harmonic frequency of the particular fundamental frequency supplied. Such a circuit will produce a frequency equal to the input frequency doubled, but when the input frequency is changed the resonant frequency of the anode circuit must be changed also if the output is not to be greatly attenuated. Thus the signal representing the phase error between the master oscillator 18 and the controlled oscillator 92 which is emitted by the detector 90 is supplied to the voltage variable capacitors 96, 98, 100 and 102 for the purpose of effecting the necessary change in the resonant frequencies of the doubler circuits 106, 108, 110 and 112.

While only one embodiment has been shown and described herein, it is recognized that many modifications will occur to those skilled in the art which will be within the spirit and scope of the invention.

I claim:

1. An electrical system for producing output signals having any of a plurality of desired frequencies including a master oscillator capable of emitting frequencies over a desired frequency range and means for varying the output frequency of said master oscillator, a time standard oscillator capable of producing an output signal which is closely controlled to a constant frequency, frequency dividing means connected to receive the output of saidmaster oscillator for dividing said output by any of a number of desired integers including a first binary divider and a series of $n$ decade counters with switches for dividing said output by an integer up to $10^n$, comparing means for comparing the outputs from said time standard oscillator and said dividing means and producing an output signal having a polarity and average voltage proportional to the direction and extent of departure of the dividing means pulse from the time standard pulse including a first flip-flop circuit and a second flip-flop circuit, a first pulse producing circuit for producing a pulse of a constant pulse duration, a first gate circuit connected to said first flip-flop circuit and to said first pulse producing circuit to which the pulse from said first pulse producing circuit is supplied, a second gate circuit connected to said second flip-flop circuit and to said pulse producing circuit to which the pulse from said first pulse producing circuit is supplied at the opposite polarity from said first gate, a third gate connected to said first flip-flop circuit, a second pulse producing circuit connected to receive an input from said third gate circuit producing a reset pulse having a greater duration than that of said first named pulse and connected to said dividing means and to said first and second flip-flop circuits to reset said dividing means and said circuits at the end of said reset pulse, such that when the output pulse from said dividing means leads that from said time standard oscillator, said flip-flop circuit is energized thereby disabling said first gate and enabling said third gate and said output pulse is also supplied to said first pulse producing circuit causing said circuit to emit a pulse to said second gate of a proper polarity to cause said automatic frequency control circuit to reduce the output frequency of said master oscillator; and when the output pulse from said dividing means lags that from said time standard oscillator, the pulse from said oscillator energizes said second flip-flop circuit which closes said second gate and causes said first pulse producing circuit to emit a pulse to said first gate of a proper polarity to cause said automatic frequency control circuit to increase the output frequency of said master oscillator;

and an automatic frequency control circuit receiving the output of said comparing means and connecting it to said means for varying the output frequency of said master oscillator and for finally locking the phase of the divided master oscillator output to that of the time standard oscillator.

2. In a frequency generator, including a master oscillator the frequency of which is voltage controlled, a constant frequency time standard oscillator, and means for dividing the frequency of said master oscillator; means for comparing the divided output of said master oscillator with the output of said standard oscillator to effect frequency control of said master oscillator, comprising first and second flip-flops, a first pulse producing circuit for producing a pulse of a constant duration, a first gate circuit controlled by said first flip-flop and controlling conduction of the output of said first pulse producing circuit, a second gate circuit controlled by said second flip-flop and controlling conduction of the output of said first pulse producing circuit, the outputs of said first and second gates being of the opposite polarity and applied to control the frequency of said master oscillator, a third gate controlled by said first flip-flop, a second pulse producing circuit for generating a reset pulse having a greater duration than that of said first named pulse, said second pulse producing circuit being actuated by output of said standard oscillator passed by said third gate to reset both of said flip-flops and the means for dividing the frequency of said master oscillator, so arranged that when the output from said dividing means leads that from said time standard oscillator said first flip-flop is energized thereby disabling said first gate and enabling said third gate and said dividing means output is also supplied to said first pulse producing circuit causing said circuit to emit a pulse to said second gate of proper polarity to reduce the output frequency of said master oscillator; and when the output from said dividing means lags that from said time standard oscillator, the output from said oscillator energizes said second flip-flop disabling said second gate and causes said first pulse producing circuit to emit a pulse to said first gate of a proper polarity to increase the output frequency of said master oscillator.

3. In a frequency generator including a master oscillator the frequency of which is voltage controlled, a constant frequency time standard oscillator, means for dividing the frequency of said master oscillator by a desired integer, means for dividing the frequency of said standard oscillator by a second desired integer, multiposition switching means for selecting the divisors of the frequencies of said master oscillator and said standard oscillator and means for comparing the divided frequency of said master oscillator with the divided frequency of said standard oscillator to develop a frequency control voltage for said master oscillator;

means for multiplying the output of said master oscillator to a desired frequency comprising, a second controlled oscillator operable over a frequency range at least inclusive of the range of said master oscillator, a phase detector circuit connected to compare the outputs of said master oscillator and said second oscillator and to produce an output voltage varying in polarity and magnitude with the direction and departure of the frequency of the second oscillator from that of said master oscillator, means responsive to said phase detector voltage for correcting the frequency output of said second oscillator to coincide with that of the master oscillator, a series of frequency doubler circuits including voltage variable capacitor means for tuning said circuits, means connecting said phase detector voltage to each of said frequency doubler circuits, and switching means connected to said multiposition switching means for coordinating the number of frequency doublers selected with the proper divisors for the frequencies of the standard oscillator and the master oscillator.

References Cited in the file of this patent

UNITED STATES PATENTS

| | | |
|---|---|---|
| 2,521,789 | Grosdoff | Sept. 12, 1950 |
| 2,627,033 | Jensen et al. | Jan. 27, 1953 |
| 2,854,579 | Vrijer | Sept. 30, 1958 |